April 25, 1950   C. W. GORDON   2,505,617
FLASH DRYING AND CALCINING SYSTEM
Filed July 10, 1947   2 Sheets-Sheet 2
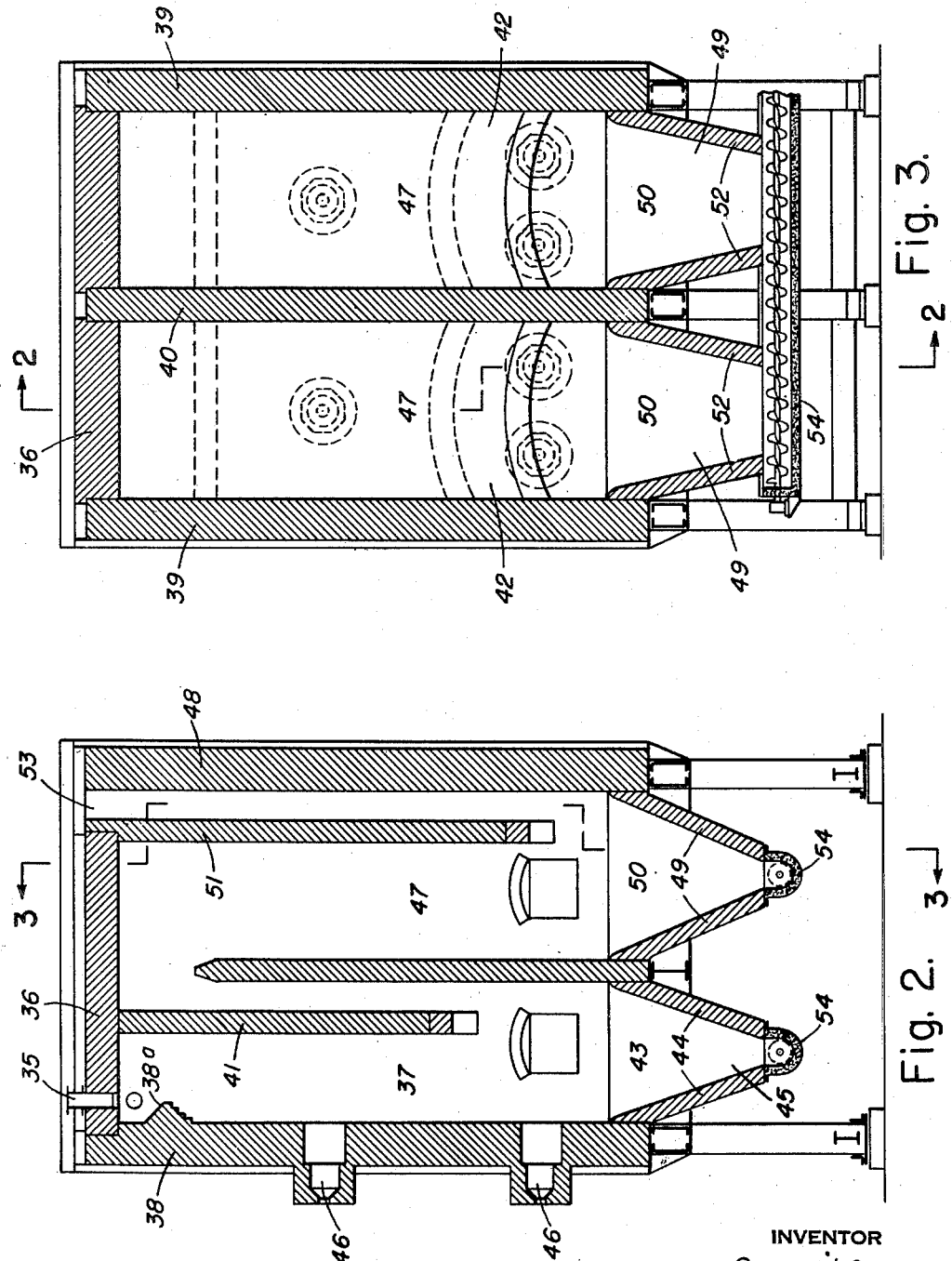
INVENTOR
CHARLES W. GORDON
BY
ATTORNEY Patented Apr. 25, 1950

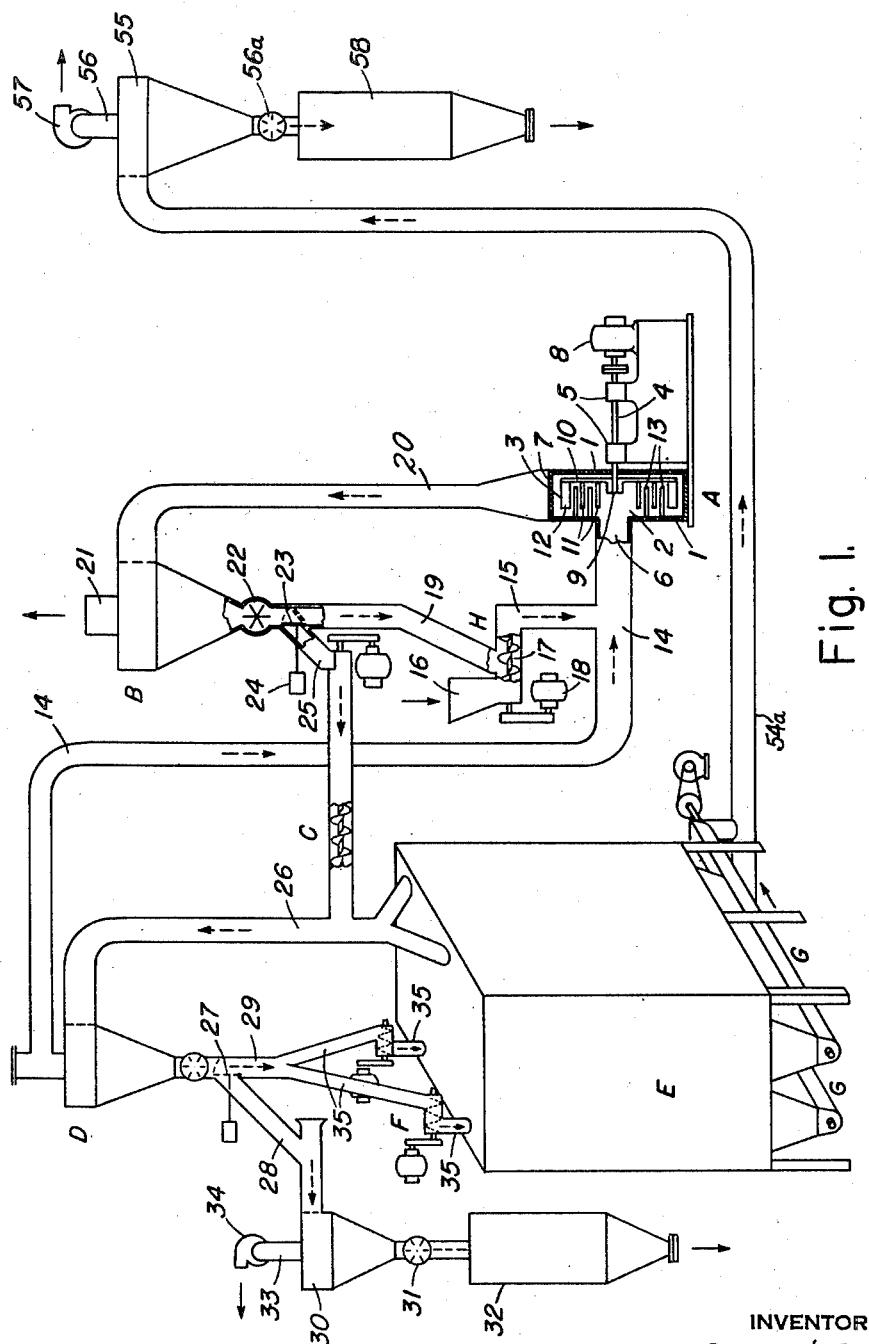

2,505,617

UNITED STATES PATENT OFFICE 2,505,617

FLASH DRYING AND CALCINING SYSTEM

Charles W. Gordon, Glen Ellyn, Ill., assignor to Combustion Engineering-Superheater, Inc., a corporation of Delaware Application July 10, 1947, Serial No. 760,077

6 Claims. (Cl. 263—53)

This invention refers to improvements in drying and calcining materials and particularly drying and calcining a sludge which results from the softening of water by the lime process and which contains principally calcium carbonate.

As the description hereof proceeds it will become apparent that still other materials, such as calcium hydroxide, strontium carbonate, clay and the like, also are susceptible to similar drying and calcining in accordance with the principles of this invention.

My improved system will be explained on the basis of its illustrative use in drying and calcining sludge that contains calcium carbonate. Water, after having been filtered to remove the soil or dirt carried in suspension therein, is treated in a reservoir with slaked lime which combines with the carbonic acid present in the water, either free or as bicarbonates, to form insoluble carbonate of lime, the soluble bicarbonates of lime and magnesia losing their carbonic acid and thereby becoming insoluble and precipitating. The resulting sludge depositing in the reservoir is delivered to a centrifuge in which the sludge is concentrated into a cake containing about 35 to 40% water.

The centrifuge is constructed and arranged to continuously receive the sludge and separately discharge the cake and the separated centrate, or liquid, and delivers substantially only calcium carbonate in the cake. The centrate contains a small quantity of calcium carbonate and a higher quantity of magnesium carbonate and other impurities. This selective classification obtained in the centrifuge permits reclaiming the calcium carbonate from the sludge cake by drying and the recovery of calcium oxide by calcining.

It is an object of this invention to provide improved apparatus for drying and calcining calcium-carbonate sludge cake and other materials susceptible to like treatment.

Another object is to provide a novel system and method of drying and heating materials such as calcium carbonate sludge cake prior to calcining those materials.

A further object is to provide improved apparatus for drying and calcining materials typified by calcium-carbonate sludge cake and for efficiently recovering the heat required for calcining.

A still further object is to provide a novel system of drying and calcining calcium carbonate and other materials and for efficiently recovering the carry over from the calcining furnace.

Additional objects of the invention will appear from the following description and drawings in which is set forth in detail one preferred embodiment of the invention. Of the drawings:

Figure 1 is a diagrammatic elevation showing a group of apparatus and devices suitably connected and combined for carrying out the drying and calcining of calcium carbonate sludge and the like in accordance with the invention;

Figure 2 is a longitudinal cross section in elevation, taken on line 2—2 of Figure 3, through a furnace suitable for use in the Figure 1 system; and Figure 3 is a transverse section through two adjacent furnaces taken on line 3—3 of Figure 2.

As illustratively shown by Figure 1, the apparatus preferably comprises a cage mill A in which the material is heated and intimately mixed with and dried by the hot gases passing therethrough; a separator B in which the ground and partly dried material is separated from the gas stream; a conveyor C for delivering the partly dried and separated material from separator B into a stream of hot gas passing into a separator D; furnace E into which the dried and heated material from separator D is fed by means of conveyors F and therein calcined, said furnaces E providing the hot gas used for drying the material throughout the system; and conveyors G which remove the calcined material from the furnaces E. A feeder conveyor H delivers the raw material, together with a portion of the partly dried material from separator B, into the cage mill A.

The cage mill here shown at A by way of example (which is the type preferred for use in this system) is basically similar to that disclosed in the patent to Gordon 2,149,018 granted February 28, 1939. Such a mill (shown by Figure 1 in cross section) comprises a casing 1 surrounding a chamber 2 within which is a beater 3 mounted for rotation on the overhanging end of a shaft 4 which is supported by bearings 5 outside of the casing 1. The casing is provided with an inlet 6 for the entry of the wet material in suspension in a stream of hot gas and a tangentially placed outlet 7 through which the partly dried material leaves.

Shaft 4 is rotated by motor 8 and on the end of the shaft extending into the casing 1 is mounted a hub 9 to which is fastened a circular plate 10 from which there extends across the chamber of the casing a plurality of rods 11. These rods are arranged in circles concentric with the shaft 4. At the periphery of plate 10 are mounted a multiplicity of fan blades 12 which like the rods are arranged in a circle concentric with the shaft 4 and extend across the chamber 2 of casing 1. In the particular disclosure shown there are two sets of rods arranged in two concentric circles said circles being spaced radially apart, a similar radial space being provided between the outermost rods 11 and the fan blades 12.

Extending into the spaces between the sets of rods 11 and the fan blades 12 are other sets of rods 13 connected to the casing 1. Here shown are two such sets of rods arranged in concentric circles with respect to the former rods 11.

In the form of cage mill disclosed, only two sets of circularly-arranged rods 11 rotate together with the fan blades 12. The remaining sets of circularly-arranged rods 13 remain stationary. This general type of cage mill is not novel per se and in some forms both sets of rods 11 and 13 may be arranged to rotate but in opposite directions. The fan blades 12 act to propel the material and gases through the system. When drying some materials a multibladed fan may be used instead of the cage mill and provide sufficient turbulance to satisfactorily effect drying.

The mill A is supplied with wet material in flotation in a stream of hot gas through conduit 14 which connects with the mill inlet 6. The wet material is dropped into said conduit 14 through a conduit 15 into which said material is delivered by means of feeder H. Raw, wet material, such as calcium carbonate sludge, is removed from the system feed hopper 16 by means of the screw 17 of feeder H which is driven by motor 18. Previously-partly-dried material, known as "dry return," is fed to the screw 17 of feeder H through a conduit 19 and the raw material and dry return become intimately mixed during their progress through the feeder so that as the mixture reaches the outlet of feeder H and falls into conduit 15 it has an average moisture content of the two.

The mixture delivered into conduit 14 enters a current of hot gas which flows therethrough from the gas outlet of separator D and enters mill A. Within the mill the intimate mixing of the hot gases and wet material causes a portion of the moisture in the material to flash into steam. The moisture-laden gas and partly dried material then pass from the mill outlet 7 through conduit 20 and are delivered into separator B (as in a direction tangential to the upper casing interior), some drying continuing en route to and within the separator. In separator B, illustratively here shown as being a well-known "cyclone" or "centrifugal" type, the ground and partly dried material is separated from the gas stream. The moisture-laden gases leave the separator B by passing upwardly through vent 21 and the separated solid leaves the separator by passing downwardly through motor driven air lock 22.

Below air lock 22 is a damper 23 which is controlled by means such as a solenoid 24 to either be in the left or vertical position shown in full lines or be swung to the right (into position shown dotted) at timed intervals, so as to direct the material leaving air lock 22 to pass to feeder H (in the former instance) or to conveyor C via conduit 25 (in the latter). By these means the flow of partly dried material from separator B is directed in proportions, depending on the time intervals of the damper settings, to conveyor H as dry return or to motor driven conveyor C as material to be further dried.

Conveyor C thereupon delivers the partly dried material into conduit 26 which conveys the flue gas from the furnaces E upwardly to the inlet of separator D, also indicated as being of a well-known "centrifugal" type. The partly dried material thus delivered by conveyor C into conduit 26 is carried by the hot flue gases into separator D to be therein separated therefrom. In its travel through conduit 26 and through the separator D the material is further completely dried and heated whereby the gas is partly cooled. The separated gas leaves the top of separator D through conduit 14 and thence is passed by that conduit into the inlet 6 of mill A.

The dried and heated material leaving the base of separator D may pass through a motor driven air lock and thence passes through a damper 27, which operates similar to damper 23, previously described, and may be manually or otherwise set (as by a solenoid) to occupy the vertical position shown dotted at times or be rotated to the right at other times. In the latter position damper 27 serves to deflect the material leaving separator D into conduit 28 and out of the system; in the former position (shown) it allows free downward passage of the material through conduit 29 to motor driven feeders F which then deliver the material into the top of the furnaces E.

The material leaving the system by way of conduit 28 may be delivered to a cyclone 30 wherein it is separated from any remaining gas and thence passes downwardly through motor driven air lock 31 into a storage hopper 32. In the illustrative arrangement shown the separated gas is removed from cyclone separator 30 through vent 33 by means of an exhaust fan 34.

The dried and heated material allowed by damper 27 to pass downwardly through conduit 29 enters the furnaces E (two in this disclosure) through chutes 35 in the roof 36 (see Figures 2 and 3), thereupon strikes the shelf 38a on each front wall 38 to be spread out, and descends through furnace chambers 37 formed by front wall 38, side walls 39, center wall 40 and intermediate walls 41 and 42. Intermediate walls 41 extend downwardly from the roof 36 and have their bottom ends spaced from the hoppers 43. The bottom of the furnaces are provided with hoppers 43 having bottom walls 44 and 45. Intermediate walls 42 extend from the hopper walls 44 upwardly and have their top ends spaced from the roof 36. Burner openings 46 extend through the front walls 38 of the furnaces.

In the illustrative form here shown (Figures 1-2-3), these furnaces E are the type disclosed and claimed by a copending application Serial No. 760,009, filed July 10, 1947, by Hans V. Pedersen, for "Flash calcining furnace." As the description hereof proceeds it will become apparent that calcining furnaces of other forms and designs may similarly be used in the improved flash drying system here disclosed.

Adjacent the combustion chambers 37 of the illustrated furnaces are separting chambers 47 formed by the continuation of the furnace side walls 39, the center wall 40 and roof wall 36, the intermediate wall 42 of the furnace forming the front wall of the separating chamber. The rear walls 48 of the separating chamber extend from the roof 36 to the bottom walls 49 of hoppers 50 and a partition wall 51, offset from the rear walls 48, extend from the roof 36 downwardly and have their lower ends spaced from the hoppers 50 in the chamber. Side walls 52 complete the hoppers 50.

The offtakes 53 for the flue gases from the separating chambers are located in the roof between the partition walls 51 and the rear walls 48. At the bottom of each of the hoppers for both the furnace and separating chambers is located a motor driven screw conveyor G (casing therefor designated 54 in Figures 2-3) for removing the separated calcined material from the furnace. Each conveyor G feeds its material to a common discharge conduit 54a whence it is carried on a stream of air to separator 55 wherein it is separated from the air which escapes through vent 56. Fan 57 serves to draw the carrier air through conduit 54a and separator 55. The separated material leaving separator 55 is removed by the motor rotated air lock 56a into storage bin 58.

The so-organized Flash Drying and Calcining System operates in a manner now to be described. This description of operation is based on the system's illustrative use in drying and calcining sludge (as from water softening) that contains calcium carbonate; in considering such description it should however be borne in mind that still other materials, such as calcium hydroxide, strontium carbonate, clay and the like, may also be treated by the new system with similar benefits.

Raw water, after presedimentation to remove soil, sand and dirt and thereafter treated by the lime process, leaves a sludge in the reservoir (not shown) wherein it has been treated and the sludge is pumped from the reservoir to a tank above a special centrifuge (also not shown). In passing through the centrifuge the sludge is concentrated into a cake containing about 35 or 40% water. The centrifuge continuously receives this sludge and separately discharges the cake and the centrate or liquid and delivers substantially only calcium carbonate in the cake to the inlet hopper 16 of Figure 1.

From that hopper the centrifuge cake is delivered to the feeder conveyor H whence it is fed into the improved system of my invention. The centrifuge cake requires the addition of some of the "dry return" for suitably reducing the average moisture content before it enters the system; in the organization shown the wet sludge supplied to hopper 16 and the "dry return" from conduit 19 are mixed within the feeder H.

In then passing through the cage mill A with the hot gases from separator D, and through conduit 20 and cyclone separator B, the moisture content of the material is reduced to a relatively low value, for example to about 7%. All of the gases which have circulated through the system leave the system through the vent 21 of separator B and the temperature of these gases is relatively very low, for example about 160 deg. F. Because the remaining moisture in the material passing through separator B, the separation is most effective and the loss of material through the vent is negligible.

The partly dried calcium carbonate is discharged from separator B into the feeder C and delivered into the column of hot gas leaving the calcining furnace E at a substantial temperature, for example about 1500 to 1600 deg. F. In passing with the gases into and through cyclone separator D the calcium carbonate is completely dried and preheated to a high temperature, for example about 800 deg. F. While passing through this second stage of drying the gases are reduced a substantial amount, for example to about 900 deg. F. and are vented into the conduit 14 which carries them into the cage mill A for the purpose of effecting the first stage of drying previously described.

The highly heated calcium carbonate is then delivered to feeders F which discharge it into the top of the calcining furnaces E. The furnaces may be provided with oil burners which discharge their flames through the burner openings 46 (see Figure 2) as more fully explained by Hans V. Pedersen's copending application Serial No. 760,009, filed July 10, 1947. The material descending through the furnce chamber 37 is calcined instantaneously and a minor portion, approximately ⅓ of the limestone, CaO, drops to the bottom of the furnace into the front hopper 43. The remaining limestone, together with the flue gases, passes upwardly from the combustion chamber 37 between walls 41 and 42, thence downwardly into chamber 47 of the separator adjacent to the furnace where substantially all of the remaining portion of the limestone falls into rear hopper 50. The flue gases then pass from separating chamber 47 upwardly in the space between walls 48 and 51 and enter the conduit 26 (see Figure 1) through offtakes 53 (see Figure 2). Any material that may be carried out with the flue gas will thence be delivered into cyclone D and therein separated out to be returned again to the furnace via conduit 29.

This is a distinct advantage in that any partly calcined material will be returned directly to the calcining furnace rather than be permitted to pass through the drying system in which case it would be reconverted to calcium carbonate and the entire operation would necessarily have to be repeated. There may, of course, be some carry over from the vent of cyclone D into the drying system; such material however will be returned back into the furnace after passing through the system.

By means of damper 27 beneath cyclone D, some of the dried calcium carbonate may be removed from the system prior to the calcining operation if so desired. There is a market for this finely divided precipitated calcium carbonate as an addition to animal foods and as a filler.

In operation of each calcining furnace E, there is a considerable excess in waste heat leaving the offtake, as compared with the actual requirement for water removal from the centrifuge cake. This excess heat is, according to the invention, used to add heat to the incoming calcium carbonate in the second stage of drying, which added heat is subsequently returned to the furnace. After having performed the function of drying in the two stages here described, the vented flue gases leaving separator B are at a very low temperature, for example at about 160 deg. F., hence the system is efficient in the use of fuel.

While the preferred embodiment of my invention has been shown and described for drying and calcining calcium carbonate, it will be understood that other materials, such as calcium hydroxide, strontium carbonate, clay and the like, may be dried and calcined in a similar manner by the system of my invention and that changes in construction, combination and arrangement of parts may be made without departing from the spirit and scope of the invention as claimed.

What I claim is:

1. In a drying and calcining system; a calcining furnace providing a source of hot gas; first and second separators organized for serial flow therethrough of said furnace gas in direction of from the second to the first separator and for serial flow therethrough of the material to be dried in direction of from the first to the second separator; a first conduit connecting the gas outlet of said second separator to the gas and material inlet of said first separator for flow of the separated gas from the second to the first separator; a second conduit connecting the flue gas offtake of said calcining furnace with the gas inlet of said second separator for flow of hot gas from the furnace into the second separator and thence into the first conduit; a vent for all of the gas from the first separator; feeding means delivering into said first conduit the raw wet material to be dried; material and gas mixing and propelling means in said first conduit between said feeding means and said first separator to facilitate a first-stage drying of the material during gas borne passage thereof from the first conduit through the mixing means and the first separator; apportioning means delivering a portion of the partly dried separated material from said first separator to said feeding means to mix with said raw wet material there coming into the system, said apportioning means delivering all of the remaining portion of the partly dried material from the first separator into the second conduit to flow with the hot gas from said calcining furnace into said second separator whereby that material is subjected to a second-stage drying during said gas borne passage thereof through the second conduit and the second separator; means for delivering the separated dried material from the second separator into the furnace to be calcined therein; and means for burning fuel in said furnace to effect said calcining in addition to providing the system with said hot gas by which the incoming material is dried in two stages and preheated before entering the furnace as aforesaid.

2. In a drying and calcining system; a high narrow calcining furnace providing a source of hot gas; first and second separators organized for serial flow therethrough of said furnace gas in direction of from the second to the first separator and for serial flow therethrough of the material to be dried in direction of from the first to the second separator; a first conduit connecting the gas outlet of said second separator to the gas and material inlet of said first separator for flow of the separated gas from the second to the first separator; a second conduit connecting the flue gas offtake in the lower portion of said furnace's combustion chamber with the gas inlet of said second separator for flow of hot gas from that chamber into the second separator and thence into the first conduit; a vent for all of the gas from said first separator; feeding means delivering into said first conduit the raw wet material to be dried; a cage mill and fan in said first conduit between said feeding means and said first separator to facilitate a first-stage drying of the material during gas borne passage thereof from the first conduit through the cage mill and the first separator; apportioning means delivering a portion of the partly dried separated material from said first separator to said feeding means to mix with said wet material there coming into the system, said apportioning means delivering all of the remaining portion of the partly dried material from said first separator into said second conduit to flow with the hot gas from said calcining furnace into said second separator whereby that material is subjected to a second-stage drying during said gas borne passage thereof through the second conduit and the second separator; means for delivering the separated dried material from the second separator into the top of said furnace's combustion chamber to decend therethrough while being calcined; means for burning fuel in said furnace combustion chamber to effect said calcining in addition to providing the system with said hot gas by which the incoming material is dried in two stages and preheated before entering the furnace as aforesaid; and means for removing the calcined material from the bottom of said furnace.

3. In a drying and calcining system; a high narrow calcining furnace providing a source of hot gas; first and second separators organized for serial flow therethrough of said furnace gas in direction of from the second to the first separator and for serial flow therethrough of the material to be dried in direction of from the first to the second separator; a first conduit connecting the gas outlet of said second separator to the gas and material inlet of said first separator for flow of the separated gas from the second to the first separator; a vent for all of the gas from said first separator; feeding means delivering into said first conduit the raw wet material to be dried; material and gas mixing and propelling means in said first conduit between said feeding means and said first separator to facilitate a first-stage drying of the material during air borne passage thereof from the first conduit through the mixing means and the first separator; a separating chamber adjacent said furnace's combustion chamber through which the furnace flue gas flows; a second conduit connecting the offtake of said separating chamber with the gas inlet of the second separator for flow of hot gas from that chamber to the second separator and thence into the first conduit; apportioning means delivering a portion of the partly dried separated material from said first separator to said feeding means to mix with said wet material there coming into the system, said apportioning means delivering all of the remaining portion of the partly dried material from the first separator into said second conduit to flow with the hot gas from said calcining furnace into said second separator whereby that material is subjected to a second-stage drying during said gas borne passage thereof through the second conduit and the second separator; means for delivering the separated dried material from said second separator into the upper portion of said furnace combustion chamber to descend therethrough while being calcined; means for removing the calcined material from the bottom of said furnace combustion chamber and from said adjacent separating chamber; and means for burning fuel at least in the upper portion of said furnace combustion chamber to effect said calcining in addition to providing the system with said hot gas by which the incoming material is dried in two stages and preheated before entering the furnace as aforesaid.

4. In a drying and calcining system; a calcining furnace providing a source of hot gas; first and second separators organized for serial flow therethrough of said furnace gas in direction of from the second to the first separator and for serial flow therethrough of the material to be dried in direction of from the first to the second separator; a first conduit connecting the gas outlet of said second separator to the gas and material inlet of said first separator for flow of the separated gas from the second to the first separator; a second conduit connecting the flue gas offtake of said calcining furnace with the gas inlet of said second separator for flow of hot gas from the furnace into the second separator and thence into the first conduit; a vent for all of the gas from the first separator; feeding means delivering into said first conduit the raw wet material to be dried; material and gas mixing and propelling means in said first conduit between said feeding means and said first separator to facilitate a first-stage drying of the material during gas borne passage thereof from the first conduit through the mixing means and the first separator; apportioning means delivering a portion of the partly dried separated material from said first separator to said feeding means to mix with said daw wet material there coming into the system, said apportioning means delivering all of the remaining portion of the partly dried material from the first separator into the second conduit to flow with the hot gas from said calcining furnace into said second separator whereby that material is subjected to a second-stage drying during gas borne passage thereof through the second conduit and the second separator; means for delivering the separated dried material from the second separator into the furnace to be calcined therein; and means for burning fuel in said furnace to effect said calcining in addition to providing the system with said hot gas by which the incoming material is dried in two stages and preheated before entering the furnace as aforesaid, the amount and temperature of said hot flue gas flowing from said furnace into the system from said burning fuel and the calcining of said material from the second separator being sufficient to dry in the system the said raw wet material fed thereinto ahead of the first separator and to heat it to a temperature of about 800 deg. F.

5. In a drying and calcining system; a calcining furnace providing a source of hot gas; first and second separators organized for serial flow therethrough of said furnace gas in direction of from the second to the first separator and for serial flow therethrough of the material to be dried in direction of from the first to the second separator; a first conduit connecting the gas outlet of said second separator to the gas and material inlet of said first separator for flow of the separated gas from the second to the first separator; a second conduit connecting the flue gas offtake of said calcining furnace with the gas inlet of said second separator for flow of hot gas from the furnace into the second separator and thence into the first conduit; a vent for all of the gas from the first separator; feeding means delivering into said first conduit the raw wet material to be dried; material and gas mixing and propelling means in said first conduit between said feeding means and said first separator to facilitate a first-stage drying of the material during gas borne passage thereof from the first conduit through the mixing means and the first separator; apportioning means delivering a portion of the partly dried separated material from said first separator to said feeding means to mix with said raw wet material there coming into the system, said apportioning means delivering all of the remaining portion of the partly dried material from the first separator into the second conduit to flow with the hot gas from said calcining furnace into said second separator whereby that material is subjected to a second-stage drying during gas borne passage thereof through the second conduit and the second separator; means for delivering the separated dried material from the second separator into the furnace to be calcined therein; and means for burning fuel in said furnace to effect said calcining in addition to providing the system with said hot gas by which the incoming material is dried in two stages and preheated before entering the furnace as aforesaid, the amount and temperature of said hot flue gas flowing from said furnace into the system from said burning fuel and the calcining of said material from the second separator being sufficient to dry in the system raw wet material having about 35 to 40% moisture content when fed thereinto ahead of the first separator and to heat it to a temperature of about 800 deg. F. while thereby cooling said furnace flue gas to a temperature of about 160 deg. F. upon leaving the system by way of said first separator vent.

6. In a drying and calcining system; a calcining furnace providing a source of hot gas; first and second separators organized for serial flow therethrough of said furnace gas in direction of from the second to the first separator and for serial flow therethrough of the material to be dried in direction of from the first to the second separator; a first conduit connecting the gas outlet of said second separator to the gas and material inlet of said first separator for flow of the separated gas from the second to the first separator; a second conduit connecting the flue gas offtake of said calcining furnace with the gas inlet of said second separator for flow of hot gas from the furnace into the second separator and thence into the first conduit; a vent for all of the gas from the first separator; feeding means delivering into said first conduit the raw wet material to be dried; material and gas mixing and propelling means in said first conduit between said feeding means and said first separator to facilitate a first-stage drying of the material during gas borne passage thereof from the first conduit through the mixing means and the first separator; apportioning means delivering a portion of the partly dried separated material from said first separator to said feeding means to mix with said raw wet material there coming into the system, said apportioning means delivering all of the remaining portion of the partly dried material from the first separator into the second conduit to flow with the hot gas from said calcining furnace into said second separator whereby that material is subjected to a second-stage drying during said gas borne passage thereof through the second conduit and the second separator; means for delivering the separated dried material from the second separator into the furnace to be calcined therein; and means for burning fuel in said furnace to effect said calcining in addition to providing the system with said hot gas by which the incoming material is dried in two stages and preheated before entering the furnace as aforesaid, said flue gas from the burning fuel and the calcining of said material from the second separator leaving the furnace at a temperature of about 1500 deg. F. in an amount sufficient to partly dry in said first separator said raw wet material containing about 35 to 40% moisture to a much lower moisture content and thereafter further to dry and heat it in said second separator to a temperature of about 800 deg. F. while thereby cooling said furnace flue gas leaving the first separator vent to a temperature of about 160 deg. F.

CHARLES W. GORDON.

REFERENCES CITED

The following references are of record in the file of this patent:

UNITED STATES PATENTS

| Number | Name | Date |
|---|---|---|
| 2,023,247 | Senseman | Dec. 3, 1935 |
| 2,075,506 | Crites et al. | Mar. 30, 1937 |
| 2,132,656 | Smith | Oct. 11, 1938 |
| 2,178,586 | Joachim | Nov. 7, 1939 |
| 2,290,068 | Petersen | July 14, 1942 |